Patented May 4, 1943

2,318,121

UNITED STATES PATENT OFFICE 2,318,121

AMINOTRIAZINE-ALDEHYDE BINDING AGENT

Gustav Widmer, Basel, and Willi Fisch, Muttenz, near Basel, Switzerland, assignors, by mesne assignments, to Ciba Products Corporation, Dover, Del., a corporation of Delaware No Drawing. Application July 27, 1937, Serial No. 156,034. In Switzerland August 1, 1936

3 Claims. (Cl. 260—9)

The present invention is concerned with the use of condensation products of aminotriazines and aldehydes as binding agents. It comprises the improved process of using said binding agents in the different fields of application as well as the improved binding agents themselves and the materials resulting from the treatment with said binding agents.

The use of artificial resins capable of being hardened, for example those from phenol and formaldehyde or urea and formaldehyde as binding agents for various purposes is known. The resins have the advantage that they can easily be applied as an adhesive in an unhardened condition in the form of a solution, a powder or suspension and then hardened to convert them into a highly insoluble form. However, owing to various disadvantages their application for many of the industries in which binding agents are required is limited.

The phenol resins are not useful in aqueous solutions and in general require a high temperature, for example 100–170° C., for the hardening operation. In the form of a cold-hardened mixture they require a large proportion of a hardening agent of an acid nature which is permissible only in a limited number of applications, for instance in acid cements. For many uses the instability of the phenol resins to light is an insurmountable disadvantage. Also urea resins which have the advantage of solubility in aqueous media require nearly as high a temperature for the hardening operation. In this case, indeed, cold hardening products, for example, cold glue, are known, but in comparison with the phenol resin glues they have a limited resistance to hot water. In particular the urea resins cannot be satisfactorily hardened with a weak acid but always require a strong acid or strong acid salt, either of which is liable to damage materials glued together with the adhesive; cellulosic materials are an example.

The present invention relates to a process of gluing which minimizes or avoids the foregoing disadvantages by the use as an adhesive of the condensation products capable of being hardened which can be produced from formaldehyde and an aminotriazine, for example an aminotriazine capable of being produced by the process described in the copending application Ser. No. 68,355, filed March 11, 1936. These products have proved to be surprisingly reactive so that the adhesives, cements, glues or the like made therefrom can be hardened or made insoluble in water at temperatures which are far below that at present used for other adhesives of the kind. It is true that in the aforesaid specification it has already been said that the condensation products from formaldehyde and amino-triazines are useful as binding agents, for example, for ply-wood, however there are mentioned there hardening temperatures of 100° C. and corresponding hardening times of 30 minutes.

It has now been found that these new condensation products can be used under substantially milder conditions of temperature, particularly already at temperatures well below 100° C. or even at room temperature as a glue which is stable not only to cold water but also to boiling water. The new adhesives therefore are suitable for a large number of applications for which the hitherto used artificial resins capable of being hardened cannot be used on account of their defects.

For gluing wood, particularly ply-wood and veneers, urea formaldehyde and phenol formaldehyde resins have been used. Urea resins, however, do not provide a glue fast to boiling water, that is to say a glue which can be subjected to the action of boiling water for 24 hours or longer without dissolution of the film of glue. On the other hand water-proof glues may be produced from phenol resins. The gluing may be done with various forms of the phenol resin, either by film gluing, whereby there is used as carrier a thin paper, or the resin may be used in an aqueous suspension or an alcoholic solution. Whatever the form it is not so satisfactory as the application of an aqueous solution in the industries requiring glue since the hardening temperature of, for example, 130° C. necessary for the phenol resins is a great draw-back not only because special hot presses are needed but also because the wood suffers.

The adhesives used according to the present invention yield a hot water stable glue, and especially have the formaldehyde condensation products of the 2.4.6-triamino-1.3.5-triazine proved suitable for the purpose.

The speed of hardening of these new glues may be varied greatly by the use of accelerators of hardening. Such an accelerator may be basic, neutral or acid. In gluing wood, substances of acid reaction are to be preferred since wood containing tannin is colored dark in presence of alkali substances. In the presence of a small proportion of an accelerator or when the pure aminotriazine formaldehyde condensation product is used the glue can be applied at a moderate temperature, for example 70–90° C., and the gluing will be remarkably fast to boiling water. Indeed, objects which are glued with this material may be in contact with boiling water for days before the parts fall asunder by destruction of the film of glue.

In the presence of large proportions of the accelerator the hardening is so rapid as to occur even at room temperature, for example on standing overnight. The quality of this gluing with respect to boiling water is of the same order as that of the hot gluing, which is surprisingly new for a cold glue.

The new adhesives may be used pure or in admixture with the usual filling and extending agents of organic or inorganic nature. Kaolin, gypsum, asbestos, barium sulfate or the like are examples of inorganic filling agents and ivory nut flour, soya bean flour, rye flour, starch and so on are examples of organic filling agents. The addition of water-repelling substances such as paraffin or aluminium salts can be recommended.

The new adhesives are advantageously produced in the form of dry preparations which may contain the binding agent, the filling agent and, if necessary, the accelerator and the like in suitable admixture so that the user can convert the preparation into a liquid glue ready for use by simply mixing it with water. These dry preparations are quite suitable for storage, whereas liquid condensation products have generally a limited capacity for storage. Such dry preparations may, of course, be brought into the form of the known glue films.

The use of the new glues is not limited to a production of ply-wood and veneers. In the form of cold hardening glue the products open up wide-spread uses which hitherto have not been available in the gluing industry. The new glues are not only odorless and without coloring effect on wood containing tannin but are also stable to fungi under conditions which are rapidly fatal to casein glue or animal glue. They are therefore much better stable to weather and may be used for joining wood which is exposed to weathering, for instance ply-wood huts, ply-wood slabs for cement mouldings, ply-wood for building constructions, autocar bodies, aeroplane construction, boat-building and so on.

The new adhesives, however, are applicable for many other purposes, for example, for fixing wall-papers, that is to say, for papering and otherwise decorating dwelling rooms or other surfaces. They are suitable for art papers or velvet papers in box making. They may be also used for saturating fabric with the solution of the binding agent and then applying the fabric in wet condition for instance for lining motorcar trunks. In like manner the binding agent may serve for fixing sail cloth in the making of fiber trunks, for fixing the insertions and linings of ordinary trunks and the like. In all these cases by suitably compounding the glue with the use of the new binding agent there is produced a union of the glued material with the support by drying at ordinary temperature, and the union is fast to boiling water.

Textile materials which have been impregnated with the new adhesive may also be used for surgical purposes, for example a gauze bandage may be impregnated therewith and wound in wet condition around the part of the body which is to be shaped or protected; after a short time at a moderate temperature or at the room temperature the layers thus formed harden and not only possess considerable strength but are completely insensitive to warm water or bath water. This possibility of shaping is also important in orthopaedy. Plaster of Paris or starch bandages which have generally been used for this purpose have the disadvantage that they are heavy or sensitive to water.

A further application for the new adhesive is as a cement or paste. For cements for making brushes it is suitable on account of its low hardening temperature, simple mode of application in aqueous solution, good water-proof character and lack of odor. In many usual cements for making brushes the high temperature of hardening and the long duration of hardening causes damage to the brush hairs. Also spreading pastes may be made with the new binding agent, the ordinary filling agent such as kaolin being added; such a paste will dry overnight at the ordinary temperature to a hard water-proof surface which will withstand boiling water if necessary and on which a top coating such as varnish may be easily and faultlessly applied. If fine wood flour is used there may be produced in like manner a hardening wood mass which can be used for obliterating wood knots, cracks, fissures and cavities in wood or the like, as is required in the wood-working industry or in the household.

The new adhesive is also suitable for making artificial cork, the product being produced in a form fast to boiling water and tasteless and odorless at a very moderate temperature, indeed even at room temperature.

A further application is for the production of waterproof sizings in the paper industry for which the absolute fastness to light, the freedom from color and smell of the binding agent particularly fit it. Here also there is the advantage of rapid hardening which may occur in the ordinary course of manufacture, for instance by the gentle heat of calendering. In its water-soluble form the new binding product serves, in combination with the usual pore fillers, pigments and the like, as a spreading paste which may be applied to the paper by means of a roller or doctor blade, dried and hardened by the dry moderately heated calender or in the cold. Lustrous and matt surfaces of any color, water-repelling or absorbent and of a high degree of stability to water may be produced in this manner. In its water-insoluble form the new binding agent may be added to the hollander for sizing the paper pulp. For satisfactory working in an aqueous medium the binding agent may be used in the form of an acid solution from which the insoluble product is precipitated in the fiber in the hollander by the addition of a base or alkali. For making waterproof fibrous plates for insulating and constructional purposes and also water-proof artificial wood plates cheap fibrous material such as wood-pulp, straw, corn stalks or the like may be beaten in the hollander and the new binding agent may be used in the form of an acid solution of the hydrophobe resin and precipitated on the fiber in presence or absence of another filling material and binding agent by means of a neutralizing agent. In this manner mechanically strong products which are odorless and do not mildew and are of very good stability to water may be obtained.

The new adhesive is also useful in the industry of water paints (size-colors or distempers). At the present time such water paints are made on a basis of animal size when used for internal painting and on a basis of casein for external painting, but they have a limited stability to weather and water. With the new adhesive water paints may be made which are of considerably enhanced stability to water as compared with size colors or casein colors so that the water paint art is extended by their use. In this case it is obvious that there can only come into question a product which hardens at ordinary temperature and is insoluble. Such water paints when made with a suitable thickening are also applicable as printing colors on paper or textile fabric. Colors for the textile industry may be made in this manner with the use of pigments of organic or inorganic nature and they prove quite stable to soaping at the boil. The use of albumen or casein for producing like effects is known and the albumen prints are stable to water. Neither of these binding agents, however, is stable to soaping at the boil. Printed papers made with the aid of the water paints are useful for making decorated laminated material in the artificial resin moulding industry; for they do not exhibit like the usual paper printed with oil varnish water-repellent properties, for instance as compared with aqueous artificial resin solutions, but on the other hand they can be impregnated therewith without difficulty.

Finally the new binding agents serve as waterproof fixing for dusting agents which are used to combat animal and vegetable pests. For this purpose a dusting agent to be used as a fungicide or insecticide, for example lead arsenate, arsenious acid, copper compounds, mercury compounds, sulfur or sulfur compounds, fluorine compounds, vegetable extracts such as pyrethrum, nicotine or the like may advantageously be suspended or dissolved in an aqueous solution of the new binding agent and sprayed upon the surface to be protected, namely plant, animal or object, there being added to the solution so much accelerator of the hardening that the product becomes insoluble in cold water within a few hours. Since in this manner the protective substance remains effective for a long time, for instance throughout the whole of the vegetation period on a plant because it is not washed away by the rain, the use of the new fixing agents constitutes a great advantage. If desired the surface activity of the solution may be increased by the addition of a wetting agent or the like or by the addition of an agent which improves its adhesiveness, for instance an oil or a resin.

It will be understood that the foregoing enumeration of some of the more important applications of the new binding agents is not exhausted. On the contrary there are numerous other industries in which the agents are useful.

The application of the new adhesives is not limited to the use of preformed condensation products of the aminotriazines. On the contrary mixtures of the components may be used. The components may be applied successively or in the form of separate solutions. Methylol compounds of the respective aminotriazine may also be used. The expression "condensation products soluble in aqueous media" is intended to include those which are insoluble as free resin bases but, can be obtained in aqueous solution in presence of acids as resin salts.

The condensation products used according to this invention as well as their manufacture are described at length in the copending application Ser. No. 68,355. Among such condensation products there may for instance be mentioned the formaldehyde condensation products of the following aminotriazines: 2.4.6 - triamino-1.3.5-triazine (melamine) or deaminated products thereof, for instance melam; further 2-chloro-4.6-diamino-1.3.5-triazine, 2 - hydroxy - 4.6 - diamino-1.3.5-triazine (ammeline) and so on.

While the 2.4.6-triamino-1.3.-5-triazine-formaldehyde condensation products have proved particularly useful for the purpose of the present invention, the use of all the other condensation products forming the subject of the said copending application is intended to be included in the present application.

The following examples illustrate the invention, the parts being by weight. The relationship between parts by weight and parts by volume is that which exists between the kilogram and the litre.

EXAMPLE 1

*A manufacture of triazine pure resin*

126 parts of 2.4.6-triamino-1.3.5-triazine (melamine) are suspended while stirring in 300 parts by volume of neutral formaldehyde of 30 per cent. strength by volume and the suspension kept in the water bath, the internal temperature of which is 80° C. The triazine dissolves in a few minutes. The condensation is continued until a sample withdrawn, cooled and diluted with 3 parts by volume of water shows a milky turbidity which is normally the case in about half an hour. The mixture is now quickly cooled and evaporated in a vacuum at low temperature to a thick syrup and the latter is immediately dried in a vacuum chest in the form of thin layers and then ground. The condensation solution may alternatively be dried by scattering or in a roller dryer. The dried powder thus obtained can be stored well and is easily soluble in water. It constitutes a binding agent for the following examples of gluing:

(a) 100 parts of the triazine pure resin are mixed with 100 parts of barium sulfate and 1 part of oxalic acid and stirred with 60 parts by volume of water to form a glue which can be spread. This glue is applied to a wood veneer, the glue coating being about 150–200 grams per square metre calculated on the dry resin, and the wood veneer is layered with crossing of the layers in the usual manner and then hardened in the hot press for 30 minutes at 80° C. under a pressure of at least 4 kilos per square cm. The veneer plate thus obtained was tested in boiling water which it withstood for 116 hours before the several veneers began to separate from each other.

(b) 100 parts of the triazine pure resin are mixed with 5 parts of ammonium sulfate and the mixture is stirred with 45 parts by volume of water to form a glue solution capable of being spread. This solution is used for making a plywood sheet which is kept for 16 hours at room temperature in the press or clamped under pressure. A test piece of this sheet is subjected to boiling water after 24 hours' storage in the air. After 150 hours of boiling the gluing is still completely intact.

(c) 100 parts of the triazine pure resin are mixed with 100 parts of gypsum powder and the mixture is stirred with 90 parts by volume of water containing 1 part by volume of formic acid. As in the preceding example a ply-wood sheet is constructed with this glue and allowed to harden overnight in a cold press. After storage for 24 hours it is tested in boiling water. After 150 hours' boiling the gluing is still completely intact.

(d) 100 parts of the triazine pure resin are mixed with 50 parts of rye flour and 50 parts of potato starch as well as 5 parts of potassium persulfate. This dry glue is stirred with 120 parts by volume of water to form a glue which can be spread and with this latter a sheet of ply-wood is constructed and kept for perfecting the union and hardening at room temperature and under pressure for 16 hours (overnight). A test piece of the sheet after 24 hours' storage in the air is subjected to boiling water. Separation of the layers begins after about 24 hours.

(e) 100 parts of the triazine pure resin are mixed with 50 parts of rye flour and 50 parts of potato starch as well as 4 parts of potassium persulfate. For making the liquid glue there are used 8 parts by volume of an aqueous paraffin emulsion of 5 per cent. strength containing an emulsifier, for instance glue, and 110 parts by volume of water. The liquid is used as described above for making a ply-wood sheet which is kept overnight under pressure at room temperature for hardening. A test piece of the sheet after storage for 24 hours in the air is tested with boiling water; only after 44 hours does the separation of the layers begin.

EXAMPLE 2

16 parts of the condensation product made as described in Example 1, paragraph 1, are dissolved while stirring in 8 parts by volume of a solution of 10 per cent. strength of ammonium sulfate and into the viscous clear resin solution thus obtained there are gradually introduced while mixing well 30 parts of kaolin and 1 part of a commercial paraffin emulsion of 20 per cent. strength. By finally kneading there is produced a cement-like mass which can be applied like a normal spatula mass for covering unevennesses, fissures or the like on a support of any kind. The mass becomes stone-hard overnight and by exposure to air and forms a good grounding for the application of a top coating, for instance of lacquer.

The mass can also be used for modeling bodies which on standing in the air for a few days become resistant to boiling water. The mass can be colored by any pigment or soluble dyestuff. By substituting fine wood flour wholly or in part for the kaolin there is obtained a mass capable of being molded which after hardening has a color resembling that of wood and having other properties resembling wood which makes it suitable for filling knot-holes, fissures, etc., in the working of wood.

All these masses should be used within a short time, about 2 hours, because they rapidly become unusable by gradual self-hardening.

EXAMPLE 3

Paint brush hairs are tied together in bundles in such a manner that the final 2 cm. of the bundle are freely exposed. The bundle is then dipped 1 cm. deep into a solution of the resin described in Example 1, paragraph 1, the solution containing 67 per cent. of resin and 33 per cent. of an ammonium sulfate solution of 10 per cent. strength. In the course of about a quarter of an hour the clear resin solution soaks into the bundle of hairs and the latter is then freed from excess of resin solution by wiping and left to dry and harden for 1 hour at 80° C. or for 8 hours at 35–40° C. or for some days at room temperature. In each case the hardening has so far proceeded that the brush may be kept in boiling water for 1 hour without any change.

EXAMPLE 4

A motor-car trunk which is lined with ply-wood is further lined in the following manner with cloth which will not mildew in damp weather or by spilt liquids.

50 parts of the resin described in Example 1, paragraph 1, are dissolved in 50 parts of ammonium sulfate solution of 5 per cent. strength to form a solution of low viscosity. Meanwhile the desired cloth is cut to make the lining pieces. These separate pieces are impregnated with the resin solution, squeezed out by hand and laid upon the ply-wood lining, which has been coated with the same solution, in wet condition, straightened and well pressed down. After each of the walls of the wooden lining have been covered the box is left in a drying room for two days. The cloth is now indissolubly united with the wood and the gluing cannot be destroyed either by mildew or wet. In like manner boxes can be lined with velvet or the like. So also in this manner wallpapers or decorative materials may be fixed to the walls of dwelling rooms, if desired with the addition of boiled starch as a stretching agent. In case of supports which still contain free lime there should first be applied a plaster of Paris coating or the lime should be neutralized by a brushing of an ammonium sulfate solution of 10 per cent. strength or neutralized with sulfuric acid whereby the acceleration of the hardening of the binding agent may occur correctly.

EXAMPLE 5

10 parts of kaolin, 10 parts of a 30 per cent. strength lithopone poor in zinc oxide and 5 parts of the dry resin described in Example 1, paragraph 1, are rubbed together with 12.5 parts by volume of ammonium chloride solution of 5 per cent. strength to form gradually a uniform paste which is then diluted with 12 parts by volume of a solution of 5 per cent. strength of bone glue. This thin water paint is applied to a wall which has previously been brushed over with an ammonium sulfate solution of 10 per cent. strength or better with a sulfuric acid solution. A white matt coating is thus obtained which after drying for two days at room temperature is fast to mopping and to water and does not strip from the support.

EXAMPLE 6

30 parts of a latex containing 70 per cent. of rubber (commercial rubber milk) are diluted with 7.5 parts by volume of concentrated ammonia solution. Into this mixture there is stirred a solution of 5 parts of the dry resin described in Example 1, paragraph 1, in 3 parts by volume of water and the mixture after being thoroughly homogenized is poured on to 50 parts of cork dust. The whole is mixed until all cork particles have been uniformly coated with a layer of liquid and the moist mixture is quickly made up into a mold and compressed in clamps or a press. After standing overnight the artificial cork plate is removed from the mold and dried for a further 24–48 hours in an airy room. There is obtained a good elastic artificial cork which does not disintegrate even when boiled in water for 1 hour.

EXAMPLE 7

20 parts of a lithopone of 30 per cent. strength are rubbed together uniformly with 10 parts of a solution of 50 per cent. strength of a triamino-triazine resin. This resin solution is made by condensing 12.6 parts of pure triamino-triazine, for instance melamine, with 30 parts of neutral formaldehyde solution of 30 per cent. strength in a water bath at 80° C. and immediately cooling, as soon as, after about 20 minutes, a sample of the solution shows a turbidity on addition of 10 times its weight of water. The white mixture is now well rubbed with 50 parts of a starch paste of 10 per cent. strength whereby a very flexible mixture is produced. This is now mixed before use with 0.25 part of ammonium sulfate in 1 part by volume of water; it is then spread on an unsized paper in a thin layer and dried. The reverse side of the paper can be similarly treated. After drying the paper is passed through a heated satin calender whereby a white matt sizing is obtained which is fast to ink. If the calender is not heated or is only feebly heated the property of fastness to ink is retained only after self-hardening for some days. The sizing may, however, be carried out in the Hollander method described in the next following example.

EXAMPLE 8

80 parts of wood-pulp calculated on dry substance are beaten in the Hollander with 4000 parts by volume of water until the fibers are separated. 320 parts of a starch paste of 5 per cent. strength are then introduced followed by 8 parts of a hydrophobe triamino-triazine resin in the form of a sulfuric acid solution. This solution is made by condensing 12.6 parts of pure triamino-triazine for instance melamine in 30 parts of a neutral formaldehyde solution of 30 per cent. strength in the water bath at 80° C. and then immediately cooling, as soon as after about 1 hour a drop of the condensation solution mixed with 1 cc. of water shows thick flocks of precipitated resin. Of this solution, which is of about 50 per cent. strength, 16 parts are used. Before introducing it into the Hollander this resin solution is precipitated by addition of 100 parts by volume of water and again cleared up by means of 30 parts by volume of 2N-sulfuric acid. After the solution has been thoroughly mixed into the Hollander with the wood-pulp 40 parts by volume of a commercial paraffin suspension of 5 per cent. strength and 8 parts by volume of an aluminium sulfate solution of 25 per cent. strength are added. The excess of sulfuric acid is now neutralized by caustic soda solution of 8 per cent. strength until Congo paper still shows brown, for which purpose 5-10 parts by volume are necessary. The pulp is now formed in a filter press to a plate which is pressed to the desired thickness and then dried at 70-80° C. and feebly super-pressed. The product is a fibrous plate of wood-like properties which has good resistance to water.

EXAMPLE 9

60 parts of Cibanone Blue RS paste double (Schultz, Farbstofftabellen No. 1228) are rubbed with 600 parts of an aqueous solution of 50 per cent. strength of the resin described in Example 1, paragraph 1, and 290 parts of tragacanth thickening which contains 60 parts of dry tragacanth in 1000 parts by volume of water; before use 50 parts by volume of concentrated formic acid are added.

The mixture is printed on a cotton fabric in the usual manner with an engraved brass or copper roller and the printing is dried at 40-50° C. for half an hour in a drying chest. The printed fabric is now washed cold and then for 10 minutes soaped in a boiling soap solution containing 3 parts of soap per 1000 parts by volume of water; hot rinsing, cold rinsing and drying follow. No trace of dyestuff pigment bleeds in the process. The pigment is thus, by this treatment, fixed fast to soaping even at boiling temperatures.

EXAMPLE 10

5 parts of arsenious acid are well rubbed with 10 parts of the triazine resin solution made as described in Example 7 and 50 parts of a starch paste of 10 per cent. strength. Before use 0.25 part of ammonium sulfate and 5 parts by volume of formic acid are added and the whole is diluted with 35 parts by volume of water. The suspension may now be applied to the plants to be protected, where it forms after drying and standing for some sunny hours of the day a strongly adherent coating which is not washed off by the rain.

EXAMPLE 11

A methylol compound of melamine is prepared as follows:

63 parts of melamine are dissolved, while stirring, on a boiling water bath in 170 parts by volume of an aqueous solution of formaldehyde of 32 per cent. strength by volume which has been neutralized with caustic soda solution, and immediately cooled in ice-water. After standing overnight the solution solidifies to a white mass, which is then broken up into pieces of the size of a pea and dried in a current of air at about 40° C. in about 3 hours. The product dissolves to a clear solution in hot water.

(a) A printing paste is made up as follows: 25 parts of ivory black are wetted with 5 parts by volume of alcohol and 3 parts by volume of Turkey red oil. 30 parts by volume of a solution of 15 parts of the above methylol compound in 15 parts of water are then stirred into the mixture together with 30 parts of an aqueous gum tragacanth thickening of 6 per cent. strength. Thereupon the mixture is made up with water to 100 parts by volume.

This paste is printed in the customary manner on a bleached cotton fabric, dried and then steamed for 5 minutes in a Mather-Platt apparatus. The material is then soaped in a solution containing 3 grams of soap per litre for 10 minutes at 80° C., rinsed and dried. Deep black effects on a white ground are obtained.

(b) A print is produced in the same manner with the use of 25 parts of titanium white or 25 parts of gold bronze instead of the above mentioned quantity of ivory black. By working in the manner described under (a) there are obtained on a black cotton taffeta white or gold colored effects on a black ground. If a white lustrous fabric, such as acetate artificial silk or viscose artificial silk is used as the ground material there are obtained matt effects on a lustrous ground which are fast to soaping.

(c) If a mixture of ivory black and titanium white is used there are obtained in an analogous manner when using a bleached cotton fabric grey effects on a white ground.

EXAMPLE 12

50 parts of fine corundum powder having a grain of ⅙ mm. or finer, are kneaded with 7.5 parts of the resin powder described in Example 1, paragraph 1, and 3 parts of water, which contains 10 grams of ammonium sulfate per 80 cc.

of water, and then stamped into round form. The latter is then subjected in a press for 3 minutes at room temperature to a pressure of 180 kilos per square cm., the moulded article is then removed and hardened for 16 hours at 80° C. A grinding disc of good strength is thus obtained.

EXAMPLE 13

The resin solution from 2.4.6-triamino-1.3.5-triazine and formaldehyde prepared as described in Example 1 is evaporated until a syrup is obtained, of which the viscosity corresponds approximately to that of chemically pure glycerine. It is then used in a normal impregnating machine, such as is used for example for impregnating thin paper with phenol-formaldehyde resin, for impregnating an unsized kraft paper having a weight of about 20 grams per square metre and the treated paper is dried in known manner at 60–80° C. There is thus obtained a glue film having a weight of about 80–100 grams per square metre, which is not more deeply colored than the untreated paper, is not hygroscopic and is odorless.

5 layers of undried birch veneer having a moisture content of about 14 per cent. are laid one upon the other with crossing of the direction of the fibers and with the interposition of a sheet of the above described glue film between each of the layers of wood, and the whole is glued in a hot water press at 90° C. for 25 minutes under a pressure of 12–15 kilos per square cm. A very well glued ply-wood sheet is thus obtained. When dried after remaining in cold water for 96 hours, or after boiling for 3 hours in water, and its tensile strength tested, in all cases a high strength is obtained with a practically clean break.

EXAMPLE 14

252 parts of a crude melamine, which contains 95 per cent. of pure melamine (2.4.6-triamino-1.3.5-triazine) besides 5 per cent. of substances insoluble in hot water (melam etc.), are condensed with 564 parts of volume of a neutral formaldehyde solution of 32 per cent. strength by volume in a reflux apparatus until a cooled test portion gives a milky turbidity when diluted with 2 parts by volume of water. The slightly turbid condensation solution is dried under vacuum on plates, and a frothy, easily puverizable product is obtained. 200 parts of the dry product are dissolved in 200 parts by volume of cold water and 2 parts of ammonium sulfate or 2 parts of dibrom-cinnamic acid are added. An absorbent kraft paper having a weight of about 20 grams per square metre is impregnated with this solution and dried in air. A non-hygroscopic glue film is thus obtained.

3 birch veneers of 1.4 mm. thickness are glued with this film at 80° C. under a pressure of 4 kilos per square cm. for 30 minutes as described in Example 1. A very well glued ply-wood sheet is obtained having similar good properties to that obtained by Example 1.

What we claim is:

1. Water-proof binding agent comprising melamine-formaldehyde condensation product, starch and an ammonium salt capable of producing acid, in aqueous dispersion.

2. Binding agent comprising starch, melamine-formaldehyde condensation product and an acid-producing salt as an accelerator.

3. A binding agent comprising an aminotriazine-aldehyde condensation product, starch and an acid-producing salt as an accelerator.

GUSTAV WIDMER.
WILLI FISCH.